United States Patent [19]

Yuuki et al.

[11] 4,369,519
[45] Jan. 18, 1983

[54] CROSS POLARIZATION COMPENSATION SYSTEM

[75] Inventors: Hironori Yuuki, Niza; Hiroshi Kurihara, Atsugi; Noboru Baba, Higashikurume; Makoto Arai; Kazunori Inagaki, both of Tokyo; Matsuichi Yamada, Yokohama, all of Japan

[73] Assignee: Kokusai Denshin Denwa Kabushiki Kaisha, Tokyo, Japan

[21] Appl. No.: 7,463

[22] Filed: Jan. 29, 1979

[30] Foreign Application Priority Data

Feb. 8, 1978 [JP] Japan ............................ 53-12263

[51] Int. Cl.³ .................................................. H04B 1/12
[52] U.S. Cl. ........................................ 455/60; 455/52;
455/295; 343/100 PE; 370/20
[58] Field of Search ......................... 325/56, 60, 62, 63,
325/65, 369, 371, 472, 473, 475, 476; 179/15
AN, 15 BL, 15 BP; 343/100 PE; 333/21 A;
455/60, 52, 62, 63, 68, 276, 278, 295, 296, 305;
370/20, 19, 6

[56] References Cited

U.S. PATENT DOCUMENTS

| | | | |
|---|---|---|---|
| 3,430,156 | 2/1969 | Katzin | 325/56 |
| 3,500,207 | 3/1970 | Ruthroff | 325/60 |
| 3,735,266 | 5/1973 | Amitay | 325/60 |
| 3,986,123 | 10/1976 | Tirro et al. | 325/60 |
| 4,027,105 | 5/1977 | Kannowade | 370/20 |
| 4,090,137 | 5/1978 | Soma et al. | 325/60 |
| 4,112,370 | 9/1978 | Monsen | 370/6 |

FOREIGN PATENT DOCUMENTS

| | | | |
|---|---|---|---|
| 2303425 | 5/1976 | France | 325/60 |
| 51-115717 | 10/1976 | Japan | 455/60 |

OTHER PUBLICATIONS

1977 IEEE International Symposium Digest AP-S, pp. 173-176, Broadband Adaptively-Controlled Polyarization Network by Gianatasio.

*Primary Examiner*—Jin F. Ng
*Assistant Examiner*—Tommy P. Chin
*Attorney, Agent, or Firm*—Robert E. Burns; Emmanuel J. Lobato; Bruce L. Adams

[57] ABSTRACT

A cross polarization compensation system, in which an input elliptically polarized wave is converted, by a first rotatable differential phase shifter having a phase shift of 90° or less than 90°, into an elliptically polarized wave defined by $$|\alpha| = |\cot^{-1}\gamma|$$

(where $\alpha$ is the tilt angle of an ellipse indicative of the elliptically polarized wave relative to a predetermined reference direction and $\gamma$ is the axial ratio for the ellipse), and then the phase delay or advance plane of a second rotatable differential phase shifter having a phase shift of the ellipse indicative of 90° is disposed in alignment with the major axis of the converted elliptically polarized wave, thereby to obtain a linearly polarized wave having electric fields components of a desired direction.

1 Claim, 11 Drawing Figures

4,369,519

CROSS POLARIZATION COMPENSATION SYSTEM

BACKGROUND OF THE INVENTION

This invention relates to a cross polarization compensation system by which, in a radio communication system with dual-polarization, cross polarization interference due to the nonisotropic property of the phase characteristic of a radio channel is removed to obtain two orthogonally polarized waves.

In a radio communication system, there is a frequency re-use system which is able to double the channel capacity by using orthogonally polarized waves of the same frequency (for example, a vertical linearly polarized wave and a horizontal linearly polarized wave, or a right hand circularly polarized wave (RHCP) and a left hand circularly polarized wave (LHCP)). In the practical use of this system, it is necessary that cross polarization interference caused in transmitting and receiving antennas and in a propagation path should be held below a permitted value. The cross polarization which is yielded by antennas can be reduced sufficiently small by techniques developed in recent years. On the other hand, the cross polarization on the propagation path is mainly due to raindrops. When a rain becomes heavier, the raindrop becomes flatter, and between the electric field component in the direction of the longer diameter of the raindrop and that in the direction of the shorter diameter, there are produced a differential attenuation (hereinafter referred to simply as DA) and a differential phase shift (hereinafter referred to simply as DPS), by which cross polarization is yielded to cause interference. As the cross polarization due to the rainfall continuously changes, adaptive compensation is required which minimizes the polarization interference following the continuous change of the rainfall. For compensating for the cross polarization interference there is a system which compensates for the cross polarization due to DPS in a first compensating portion and the cross polarization due to DA in a second compensating portion. With one such system, the cross polarization resulting from DPS is compensated for by rotatable differential 90° and 180° phase shifters, such as a circular waveguide with a dielectric plate inserted therein, and the cross polarization resulting from DA is cancelled by a cross coupling circuit provided at a subsequent stage (Japan Pat. Disc. No. 115717/76). Moreover, there is a second system which employs a DPS compensating portion identical with the abovesaid one but differs in principle from the above first method (See 1977 IEEE International Symposium Digest AP-S, PP. 173-176, "Broadband Adaptively-Controlled Polarization Network"). The above two systems have defects such that the angle of phase shifters cannot be uniquely determined, and that the response speed of the phase shifters is not so high.

SUMMARY OF THE INVENTION

This invention is to provide a cross polarization compensating system which is free from the abovesaid defects of the conventional cross polarization compensating systems using 90° and 180° differential phase shifters and with which it is possible to effectively compensate for cross polarization resulting from the non-isotropic property of a propagation path, in particular, cross polarization due to DPS.

To achieve the above object, in this invention, an input elliptically polarized wave is converted, by a first rotatable polarizer having a phase shift of 90° or less than 90°, into an elliptically polarized wave defined by $$|\alpha| = |\cot^{-1}\gamma|$$

(where $\alpha$ is the tilt angle of an ellipse indicative of the converted elliptically polarized wave to a predetermined reference direction and $\gamma$ is the axial ratio for the ellipse), and then the phase delay or advance plane of a second rotatable differential phase shifter having a phase shift of 90° is disposed in alignment with the major axis of the converted elliptically polarized wave, thereby to obtain a linearly polarized wave having electric field components of a desired direction.

BRIEF DESCRIPTION OF THE DRAWINGS

The invention will be described in comparison with conventional systems with reference to accompanying drawings, in which:

FIGS. 2A, 2B, 2C, 3A and 3B are polarization characteristics explanatory of the operation of the prior art example shown in FIG. 1;

DETAILED DESCRIPTION OF THE INVENTION

To make differences between this invention and the aforementioned prior art systems clear, the prior art systems will first be described.

Figure 1:
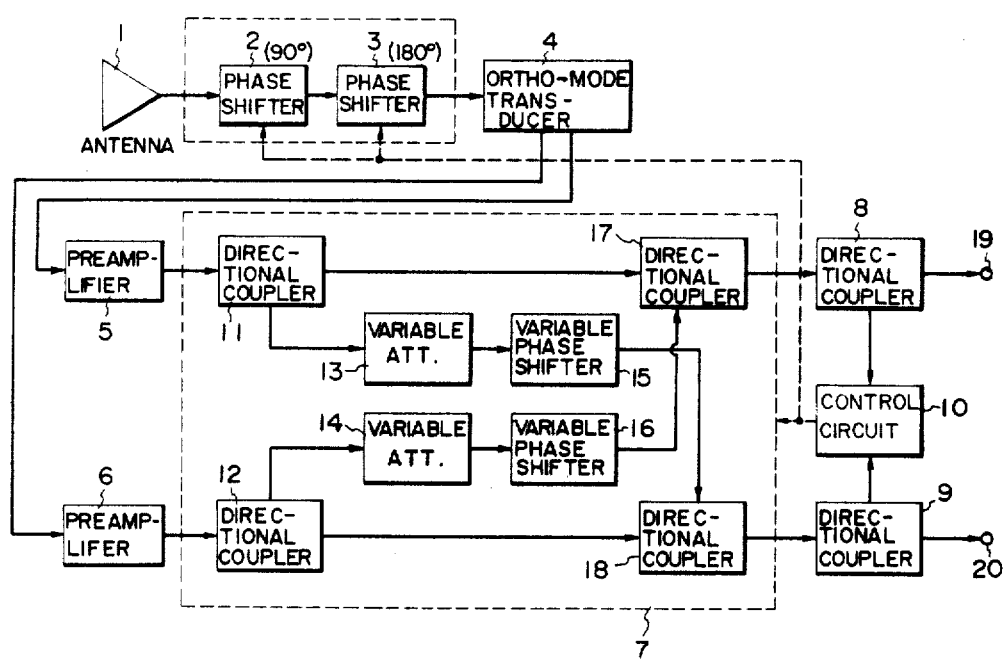
FIG. 1 is a block diagram showing an example of conventional systems.
Figure 2A:
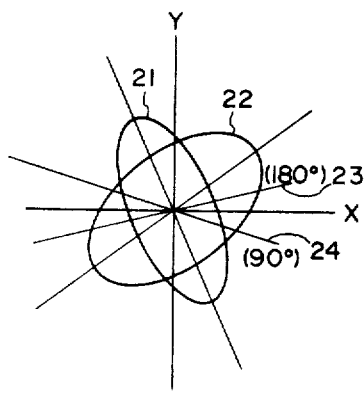
Figure 2B:
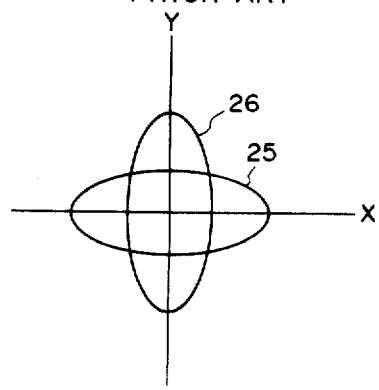

An example of the arrangement for performing the first system of the prior art systems is shown in FIG. 1. In FIG. 1, reference numeral 1 designates an antenna; and 2 and 3 designate rotatable differential 90° and 180° phase shifters forming a first compensating portion which, by changing the rotational angles of the phase shifters independently of each other, compensates for the cross polarization owing to DPS to convert a circularly polarized wave to a linearly polarized one or vice versa. Reference numeral 4 identifies an orthogonal-mode transducer (OMT); 5 and 6 denote low-noise preamplifiers (LNA); 7 represents a second compensating portion for compensating for the cross polarization resulting from DA; 8 and 9 show a directional coupler; and 10 refers to a control circuit for the phase shifters 2 and 3 and the compensating portion 7. The compensating portion 7 is composed of directional couplers 11, 12, 17 and 18, variable attenuators 13 and 14, variable phase shifters 15 and 16. The principle of compensation by this method will be described in brief with reference to FIG. 2. For convenience of explanation, a receiving system for orthogonal circular polarizations is considered, and a reference direction is assumed to be a horizontal line, which is taken as the X axis, and a line perpendicular thereto is taken as the Y axis. When encountered with a rainfall, two pilot signals transmitted in LHCP and RHCP are received as such two elliptically polarized waves are indicated by 21 and 22 in FIG. 2A in which they have different axial ratios and their tilt angles also do not cross each other at right angles due to DA and DPS. In this case, if the rotatable differential phase shifters 2 and 3 are set at suitable positions (determined by the axial ratios and the tilt angles), as indicated by 23 and 24, the two elliptically polarized waves are converted to such elliptically polarized waves as are shown in FIG. 2B in which their major axes are each aligned with the X or Y axis of the other. If two output terminals of the OMT 4 disposed at right angles to each other are placed in alignment with the X and Y axes, respectively, the electric fields of an elliptically polarized wave 25 can be mostly derived from the output terminal of the X-axis direction, whereas the electric fields of an elliptically polarized wave 26 can be mostly derived from the output terminal of the Y-axis direction. However, field components of the elliptically polarized waves 26 and 25 still remain in the outputs of the X and Y axes, respectively, which is the cross polarization due to DA. To compensate for this, the output signals from the OMT 4 are amplified by the preamplifiers 5 and 6, and in the second compensating portion 7, electric fields equal in magnitude and reverse in polarity to the remaining cross polarization are produced by the variable attenuators 13 and 14 and the variable phase shifters 15 and 16 from the electric fields of the co-polarized wave components, and then the electric fields thus produced and the abovesaid cross polarization are added together by the directional couplers 17 and 18, respectively, to cancel the remaining cross polarization due to DA. Thus, outputs with no polarization interference can be obtained from signal output terminals 19 and 20.

Figure 3A:
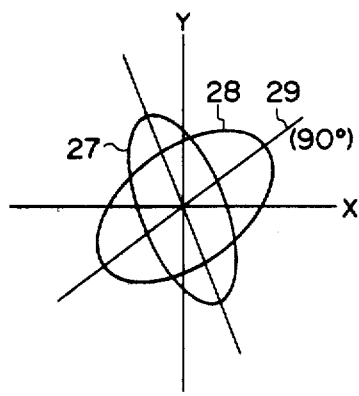
Figure 3B:
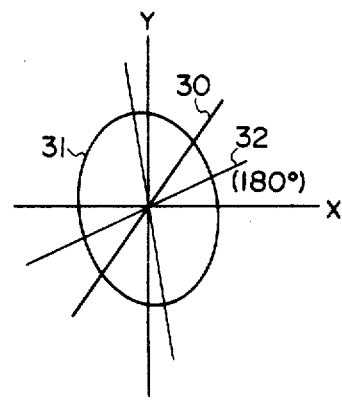

With the second system of the prior art system, the same results as those in the above can be obtained by using only one pair of the variable attenuator 13 or 14 and the variable phase shifter 15 or 14. This will be described in conjunction with FIGS. 3A and 3B. Let it be assumed that RHCP and LHCP are received as elliptically polarized waves 27 and 28 due to a rainfall, as shown in FIG. 3A. If the rotatable 90° phase shifter 2 is disposed in a direction 29 of the tilt angle of the elliptically polarized wave 28 as depicted in FIG. 3A, this elliptically polarized wave is converted to a linearly polarized one 30 and the input elliptically polarized wave 27 is converted to an elliptically polarized one 31, as shown in FIG. 3B. Next, if the rotatable differential 180° phase shifter 3 is disposed intermediate between the X axis and the linearly polarized wave 30, as indicated by 32, the linearly polarized wave 30 is converted to a linearly polarized wave of the X-axis direction, and its electric fields are all derived from the X-axis output terminal of the OMT 4. The electric fields of the elliptically polarized wave 31 shown in FIG. 3B are almost derived in the Y-axis direction but partly appear at the X-axis direction. This interference wave is cancelled in the compensating portion 7. With this method, the electric fields of the input elliptically polarized waves 28 are all picked up from the X-axis output of the OMT 4 and does not interfere with the Y-axis, so that one pair of the variable attenuator and the variable phase shifter may suffice in the compensating portion 7. As signals for controlling the rotation of the phase shifters 2 and 3, use is made of in-phase and quadrature components of the output cross polarization detected by co-polarized wave components.

With the system based on either of the above-described two principles, the system employing the 90° and 180° phase shifters has a defect such that in a case of arrival of orthogonal circular polarization, since the 90° phase shifter converts orthogonal circular polarizations to orthogonal linear polarization regardless of the set angle, the angles of the 90° and 180° phase shifters cannot be uniqualy determined. This is undesirable for the compensation for cross polarization in a communication system employing orthogonal circular polarization such as the INTELSAT-V satellite communication system. Further, in a case where the canting angle of a raindrop changes, the 90° and 180° phase shifters must be rotated through a fairly large angle in accordance with the change of the canting angle even if the amount of cross polarization generated is small. The response speed of the phase shifters also presents a problem. Moreover, there is a defect in that the construction of such phase shifters needs a large antenna feed system.

The instant invention will hereinafter be described in detail below.

Figure 4:
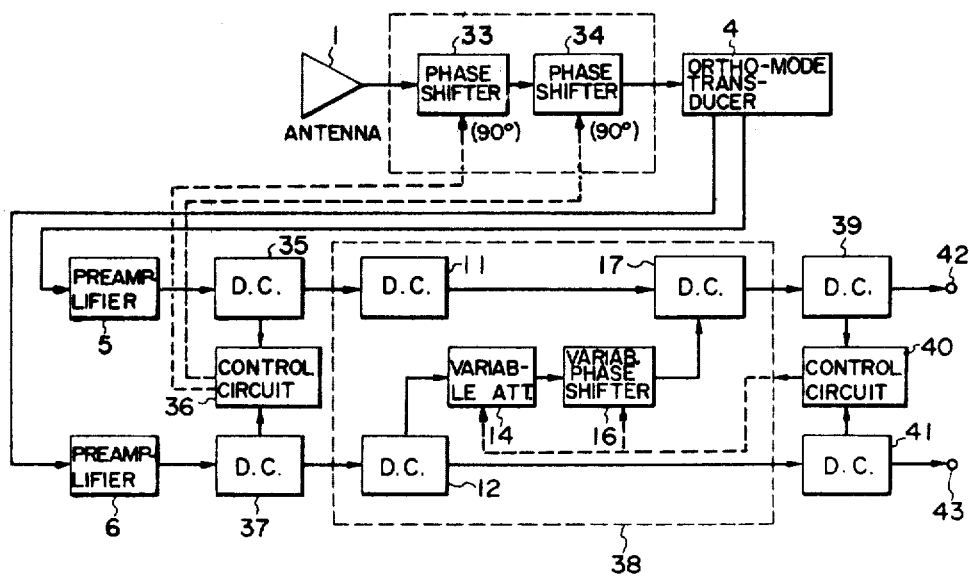
FIG. 4 is a block diagram illustrating an embodiment of this invention.
Figure 5:
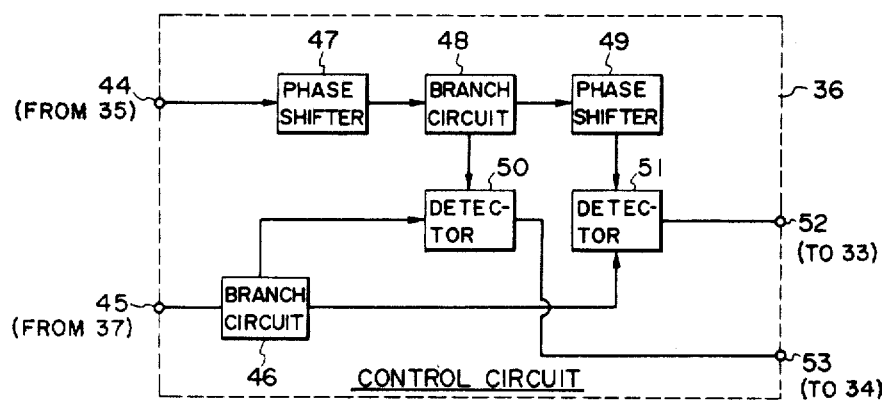
FIG. 5 is a block diagram showing an example of a control circuit for use in this invention.

FIG. 4 is explanatory of the principle of this invention, FIG. 5 illustrates an example of a control circuit, and FIG. 6 shows the state of a polarized wave, explanatory of a compensating operation.

In FIG. 4, reference numeral 1 indicates an antenna; 33 and 34 designate a rotatable differential phase shifter having a phase shift of 90° or less than 90° and a rotatable differential phase shifter having a phase shift of 90°, respectively; 4 identifies an OMT; 5 and 6 denote low-noise preamplifiers; 35 and 37 represent directional couplers; 36 shows a control circuit for controlling the rotation of the phase shifters 33 and 34; 38 refers to a compensating circuit for compensating for the cross polarization resulting from DA; 11 and 12 indicate directional couplers; 14 designates a variable attenuator; 16 identifies a variable phase shifter; 17, 39 and 41 represent directional couplers; 40 shows a control circuit for controlling the variable attenuator 14 and the variable phase shifter 16; and 42 and 43 refer to output terminals.

Referring now to FIGS. 4, 5, 6A and 6B,, the operating principle of this invention will be described in detail. To facilitate the description, a receiving system is considered and let it be assumed that the phase shift of each of the rotatable differential phase shifters 33 and 34 is 90° and that RHCP and LHCP are transmitted from the transmitter side. For convenience of description, the reference direction is assumed to be the horizon and taken as the X-axis, and a line perpendicular thereto is taken as the Y-axis, and let it be assumed that the OMT 4 is disposed with its perpendicularly crossing output terminals in alignment with the X and Y axes, respectively. The transmitted RHCP and LHCP reach the antenna 1 as elliptically polarized waves owing to DA and DPS of a rainfall. The compensating method of the present invention is to convert one elliptically polarized wave of the input pilot signals to a linearly polarized wave coincident in direction with one output terminal of the OMT 4. The elliptically polarized waves of the pilot signals received by the antenna 1 are applied via the rotatable differential phase shifters 33 and 34 to the OMT 4 in which they are divided into a co-polarized wave component and a cross polarized wave component. The outputs from the OMT are respectively amplified by the preamplifiers 5 and 6 and then applied to the directional couplers 35 and 37. One output from each directional coupler is applied to the DA compensating portion 38 and the other output is applied to the control circuit 36 for controlling the phase shifters 33 and 34. This circuit produces two signals respectively corresponding to the sum of and a difference between an in-phase component in-phase with as the co-polarized wave and a quadrature component against the co-polarized wave. These signals are used as control signals for the rotatable differential phase shifters 33 and 34.

Figure 6A:
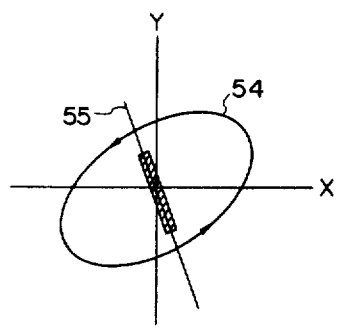
FIGS. 6A, 6B and 6C are polarization characteristic diagrams explanatory of the operation of this invention.
Figure 6B:
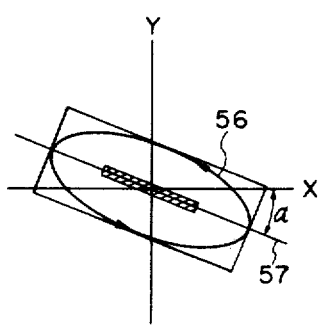
Figure 6C:
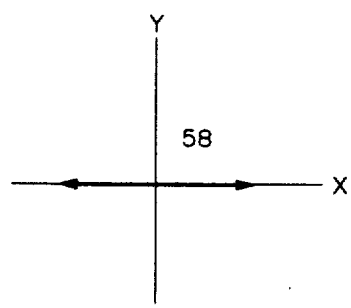

FIG. 5 illustrates an embodiment of the control circuit 36. In FIG. 5, the co-polarized wave is supplied from an input terminal 44, whereas a cross polarized wave is supplied from an input terminal 45. Reference numerals 47 and 49 indicate phase shifters for changing the phase of the co-polarized wave; 46 and 48 designate branch circuits; 50 and 51 denote detectors; and 52 and 53 represent output terminals for drive signals driving the phase shifters 33 and 34. In this example, by selecting the phase shift values of the phase shifters 47 and 49 to be 45° and 90°, respectively, the abovesaid control signals can be obtained. The control of the rotation of the two rotatable differential phase shifters 33 and 34 by the abovesaid two signals comes to an end when interference by the cross polarization is removed at the output from the OMT 4, that is, when the cross polarization from one output terminal of the OMT 4 is reduced to zero. In this state, the 90° phase shifters 33 is set at a position 55 relative to an incoming elliptically polarized wave 54 to satisfy the equation (1) described latter on, as shown in FIG. 6A, by which the elliptically polarized wave 54 is converted to such an elliptically polarized one as indicated by 56 in FIG. 6B. The position 55 is determined to satisfy the following equation:

$$|\alpha| = |\cot^{-1}\gamma| \qquad (1)$$

where α is the tilt angle (an angle between the major axis and the X-axis) of an ellipse indicative of the elliptically polarized wave 56 and γ is the axial ratio of the ellipse. If the elliptically polarized wave 56 is a counter clockwise one, the phase delay plane of the 90° phase shifter 34 lies in a direction 57 of the major axis of the elliptically polarized wave 56 to delay the electric field of the major axis direction by 90°, by which the elliptically polarized wave is converted to a linearly polarized one 58 of the X-axis direction. Where the elliptically polarized wave 56 is clockwise, the phase advance plane of the 90° phase shifter 34 lies in the major axis direction 57 to convert the elliptically polarized wave to a linearly polarized one. This linearly polarized wave 58 has no electric field components in the Y-axis direction as shown in FIG. 6C, and hence does not interfere with the Y-axis direction output from the OMT 4. That is, by such control, the phase shifters 33 and 34 are automatically set at positions which fulfil the abovesaid condition, and the input elliptically polarized wave is rendered into a linearly polarized one of the X-axis direction and derived from the OMT 4. Especially in a case of a circularly polarized wave arriving, when to convert, for example, a counter clockwise circularly polarized wave to a linearly polarized wave aligned with the X-axis, it is necessary that the angle of the phase shifter 33 is of −45° and the angle of the phase shifter 34 is of 0° or 90°. With the control operation described above, the phase shifters 33 and 34 automatically bear such an angular relationship. By controlling the rotation of the phase shifters 33 and 34 with in phase and quadrature components of the cross polarized wave, the aforesaid compensating control can also be achieved though the response characteristic changes a little. In this instance, if the phase shift values of the phase shifters 47 and 49 shown in FIG. 5 are selected to be 0° or 180° and 90°, respectively, the abovementioned control signals can be obtained.

Figure 7:
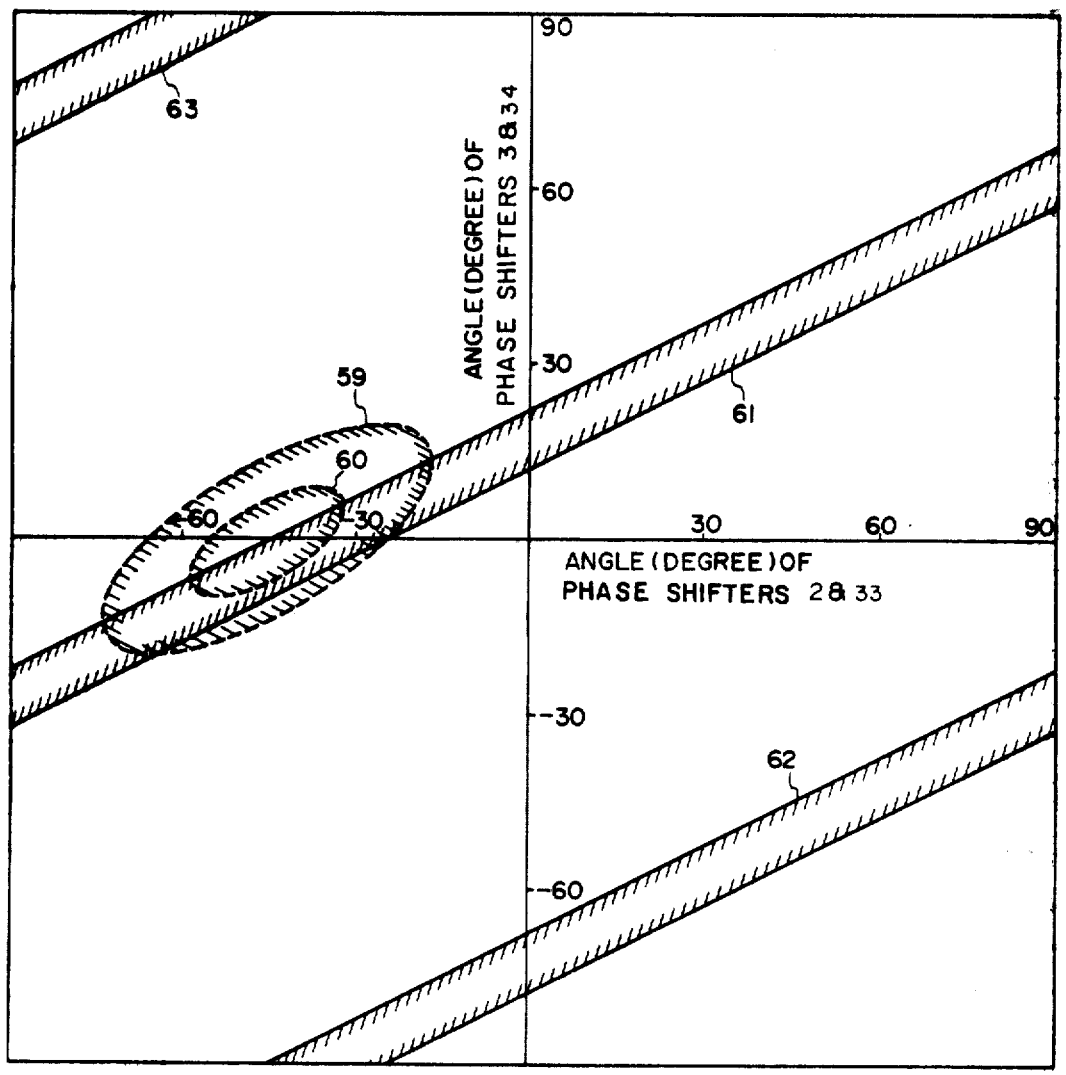
FIG. 7 is a characteristic diagram showing the operating ranges of phase shifters explanatory of this invention in comparison with the prior art system.

FIG. 7 shows an example of the angular relationship between the two phase shifters which achieves the compensation when DPS of a rainfall varies in the range of 0° to 40° and the canting angle of the raindrop varies in the range of −90° to +90° in a case of the conventional arrangement using rotatable differential 90° and 180° phase shifters and in a case of the arrangement of this invention employing the rotatable differential 90° and 180° phase shifters. In FIG. 7, the abscissa represents the angles of the phase shifters (2 and 33) succeeding the antenna 1 and the ordinate the angles of the phase shifters (3 and 34) preceding the OMT 4. In the conventional arrangement using the 90° and 180° phase shifters, the phase shifter 2 has a phase shift of 90°. An ellipse 59 in FIG. 7 shows the angular range in which the compensation is achieved according to this invention system, and oblique bands 61, 62 and 63 shows the angular ranges in which the compensation is carried out according to the conventional system using the 90° and 180° phase shifters. An ellipse 60 is the angular range of this invention system in a case of DPS=20°. As is evident from the above, the compensating operation of this invention is completed with a far smaller rotational angle than in the conventional system using the 90° and 180° phase shifters. Further, it appears from the magnitudes of the ellipses 59 and 60 that the rotational angle necessary for the compensating operation decreases with a decrease in DPS of rain. In the conventional system, however, the rotational angle for the compensating operation varies greatly with the canting angle of the raindrop regardless of the DPS.

As is apparent from the above, the length of the phase shifters in this invention is ⅔ of the length of the conventional system using 90° and 180° phase shifters, so that the response to the variations of the cross polarization can be quickly achieved at higher speed than in the conventional system. In the foregoing, the canting angle of the raindrop is described to range from −90° to +90°, but in view of the fact that it is known that actual canting angles of raindrops are distributed mostly in the vicinity of 0°, it is desirable that the rotational angle necessary for the compensation is minimum in the neighborhood of the canting angle 0°. With the system of this invention, the above can be effected by rotating the OMT 4 to suitably displace its orthogonal output terminals from the X and Y axes respectively. Moreover, if a maximum value of DPS of rain can be predicted, either one of the rotatable differential phase shifters 33 and 34 may be a phase shifter having a phase shift equal to the maximum value of DPS, and in the 4 GHz and 6 GHz bands which are ordinary used in satellite channels, the phase shift may be less than 90°, so that the compensating device can be further reduced in size. The above description has been given in connection with a receiving system, but compensation in a transmitting system can also be achieved in a likewise manner. Further, compensation is equally possible in either of the case of orthogonal circular polarization and orthogonal linear polarization.

As has been described in the foregoing, the compensating system of this invention is designed to compensate for cross polarization due to DPS by employing two rotatable differential phase shifters respectively having a phase shift of 90° and a phase shift of 90° or less than 90° in an antenna feed portion. This invention has the following advantages:

(1) As compared with conventional systems, the rotational angle of the phase shifter necessary for the compensating operation is small and the response speed is high.

(2) Especially, even in a case of circularly polarized waves arriving, the angle at which the two phase shifters are set is uniquely determined. This indicates that, in a communication system using orthogonal circular polarization, the compensating operation is stable in cases of fine weather and a light rain.

(3) Since the phase shift of the rotatable differential phase shifters is smaller than in the prior art, the device can be made small in size.

What we claim is:

1. A cross polarization compensation system comprising:
    input terminal means for receiving an input elliptically polarized wave;
    first rotatable differential phase shift means having a phase shift of 90° or less than 90° and operatively connected to said input terminal means for phase shifting the received elliptically polarized wave;
    first control means operatively connected to said first rotatable differential phase shift means for controlling said first rotatable differential phase shift means so that said input elliptically polarized wave is converted by said first rotatable differential phase shift means into a converted elliptically polarized wave defined by $$|\alpha| = |\cot^{-1}\gamma|$$

where $\alpha$ is the tilt angle of an ellipse indicative of the converted elliptically polarized wave to a predetermined reference direction and $\gamma$ is the axial ratio for said ellipse;
    second rotatable differential phase shift means having a phase shift of 90° and connected to said first rotatable differential phase shift means for phase shifting said converted elliptically polarized wave; and
    second control means operatively connected to said second rotatable differential phase shift means for disposing the phase delay or advance plane of said second rotatable differential phase shift means in alignment with the major axis of the ellipse indicative of the converted elliptically polarized wave, thereby to obtain a linearly polarized wave having electric fields components of a desired direction through said second rotatable differential phase shift means.

* * * * *